United States Patent
Brockhaus et al.

(10) Patent No.: US 10,680,832 B2
(45) Date of Patent: Jun. 9, 2020

(54) COMPUTER APPARATUS FOR TRANSMITTING A CERTIFICATE TO A DEVICE IN AN INSTALLATION

(71) Applicant: SIEMENS SCHWEIZ AG, Zürich (CH)

(72) Inventors: Hendrik Brockhaus, Unterbiberg (DE); Jens-Uwe Bußer, Neubiberg (DE); Jürgen Gessner, Forstinning (DE)

(73) Assignee: SIEMENS SCHWEIZ AG, Zürich (CH)

(*) Notice: Subject to any disclaimer, the term of this patent is extended or adjusted under 35 U.S.C. 154(b) by 178 days.

(21) Appl. No.: 15/683,798

(22) Filed: Aug. 23, 2017

(65) Prior Publication Data
US 2018/0062861 A1 Mar. 1, 2018

(30) Foreign Application Priority Data
Aug. 26, 2016 (DE) .................. 10 2016 216 115

(51) Int. Cl.
| | |
|---|---|
| *H04L 29/06* | (2006.01) |
| *H04L 9/32* | (2006.01) |
| *H04L 9/08* | (2006.01) |
| *G06F 21/33* | (2013.01) |

(52) U.S. Cl.
CPC ............ *H04L 9/3268* (2013.01); *G06F 21/33* (2013.01); *H04L 9/088* (2013.01); *H04L 63/0823* (2013.01); *H04L 63/0876* (2013.01)

(58) Field of Classification Search
CPC combination set(s) only.
See application file for complete search history.

(56) References Cited

U.S. PATENT DOCUMENTS

| | | | |
|---|---|---|---|
| 5,982,898 A | 11/1999 | Hsu et al. | |
| 10,404,477 B1* | 9/2019 | Deck | H04L 9/3268 |
| 2003/0120915 A1* | 6/2003 | Kleinsteiber | H04L 49/10 |
| | | | 713/153 |

(Continued)

OTHER PUBLICATIONS

"Samuel Paul Kaluvuri, Hristo Koshutanski, Francesco Di Cerbo, Antonio Mana, Security Assurance of Services Through Digital Security Certificates, Jun. 28-Jul. 3, 2013, IEEE Xplore, INSPEC#13879056" (Year: 2013).*

(Continued)

*Primary Examiner* — Phy Anh T Vu
(74) *Attorney, Agent, or Firm* — Schmeiser, Olsen & Watts LLP

(57) ABSTRACT

A computer apparatus for transmitting a certificate to a device in an installation is provided. The computer apparatus has a coupling unit for establishing and breaking a connection between the computer apparatus and the device, a processing unit for transmitting a certificate to the device by means of the established connection, wherein the certificate is valid for a first time period and is issued by a certification authority based on a certificate request, and a receiving unit for receiving a further certificate request from the device by means of the established connection, wherein the further certificate request is designed to request a certificate for a second time period, wherein the coupling unit is designed to break the connection after the certificate is transmitted and the further certificate request is received.

14 Claims, 1 Drawing Sheet

(56) References Cited

U.S. PATENT DOCUMENTS

| | | | |
|---|---|---|---|
| 2004/0243805 A1* | 12/2004 | Enokida | H04L 63/0823 713/175 |
| 2005/0021969 A1 | 1/2005 | Williams et al. | |
| 2005/0071630 A1 | 3/2005 | Thornton et al. | |
| 2005/0160259 A1* | 7/2005 | Ogura | H04L 9/00 713/156 |
| 2006/0015716 A1* | 1/2006 | Thornton | H04L 63/0823 713/155 |
| 2006/0291664 A1 | 12/2006 | Suarez | |
| 2008/0016337 A1* | 1/2008 | Morgan | H04L 63/062 713/158 |
| 2008/0222413 A1* | 9/2008 | Vilhuber | H04L 63/0442 713/156 |
| 2009/0031410 A1* | 1/2009 | Schneider | H04L 63/0823 726/10 |
| 2009/0138946 A1* | 5/2009 | Schneider | G06F 21/33 726/5 |
| 2009/0228703 A1 | 9/2009 | Grajek et al. | |
| 2011/0213966 A1* | 9/2011 | Fu | H04L 63/0807 713/158 |
| 2012/0002650 A1* | 1/2012 | Yanagisako | H04W 24/02 370/338 |
| 2012/0166796 A1* | 6/2012 | Metke | H04L 9/321 713/158 |
| 2013/0262858 A1 | 10/2013 | Neuman et al. | |
| 2013/0311771 A1* | 11/2013 | Hoggan | H04L 9/3268 713/156 |
| 2014/0006788 A1* | 1/2014 | Ignatchenko | H04L 63/0428 713/175 |
| 2014/0165147 A1* | 6/2014 | Hershberg | H04L 63/083 726/4 |
| 2014/0359741 A1* | 12/2014 | Kistner | H04L 63/0823 726/7 |
| 2015/0121478 A1* | 4/2015 | Huang | H04L 63/0823 726/4 |
| 2015/0156270 A1* | 6/2015 | Teraoka | G06F 13/00 709/219 |
| 2015/0304309 A1* | 10/2015 | Verma | H04L 63/0823 713/156 |
| 2018/0034646 A1* | 2/2018 | Kuramoto | H04L 9/3234 |
| 2018/0060608 A1* | 3/2018 | Holden | G06Q 20/38215 |
| 2018/0302226 A1* | 10/2018 | Heimlicher | H04L 9/3271 |

OTHER PUBLICATIONS

"Lein Harn, Jian Ren, Generalized Digital Certificates for User Authentication and Key Establishment for Secure Communications, May 19, 2011, IEEE Xplore, vol. 10, pp. 2372-2379" (Year: 2011).*

* cited by examiner

COMPUTER APPARATUS FOR TRANSMITTING A CERTIFICATE TO A DEVICE IN AN INSTALLATION

CROSS-REFERENCE TO RELATED APPLICATIONS

This application claims priority to German application No. DE 10 2016 216 115.6 having a filing date of Aug. 26, 2016, the entire contents of which are hereby incorporated by reference.

FIELD OF TECHNOLOGY

The following relates to a computer apparatus for transmitting a certificate to a device in an installation. The following also relates to a system comprising a computer apparatus of this kind. The following further relates to a method for transmitting a certificate to a device in an installation. The following furthermore relates to a computer program product which arranges for the method as described above to be carried out on a program-controlled device.

BACKGROUND

Certificates are used, for example, for authentication, for checking digital signatures or generally for operational or operative processes in various installations, such as industrial installations or else vehicles for example.

Digital key certificates link information about the identity of the certificate holder to the public key of the certificate holder, wherein the certificate holder can also be a device. In this case, the device certificate links the key to a unique parameter of the device, for example a serial number or MAC address. Device certificates are preferably already provided during production by the manufacturer, and also serve for confirmation of authenticity for the device (so-called manufacturer certificates).

Manufacturer certificates usually have a very long validity period (usually several years), so that the device can use this certificate over its entire period of use, for example as a trust anchor for requesting or creating further certificates for operation. In addition, the (root) certificate of the issuing certification entity or certification authority (CA)—and possibly further intermediate certificates—also has to be valid over a time period of corresponding length.

For operation purposes, the devices are often additionally equipped with further, operative certificates. The operative certificates are usually installed or automatically distributed during engineering (configuration) of the devices and are usually regularly renewed. Key pairs comprising a private and a public key are used to this end, said key pairs preferably being generated in the device itself.

Said key pairs can be matched to specific intended uses such as TLS communication, signatures or encryption, for example by selecting different cryptographic algorithms to those in the manufacturer certificate. In addition or as an alternative to the information provided by the manufacturer, said key pairs can also contain information relating to special tasks of the device in the installation, for example "Router 123", "Munich railway station, switch 17", "Heating Controller Room 123", etc.

Since the private keys, which belong to operative certificates, are used more—and also possibly are cryptographically weaker —, operative certificates usually have a considerably shorter validity period than manufacturer certificates. Therefore, said operative certificates have to be able to be replaced more easily.

In order to create operative certificates, a key pair is generated in the device and the public key is read out—usually in the form of a certificate signing request (CSR). This CSR then has to be transported in an authentic and integrity-protected form to the certification entity (CA). To this end, the CSR may already be additionally signed in the device with the private key of an already existing certificate of the device (the manufacturer certificate in the case of bootstrapping, either also the manufacturer certificate or an existing operative certificate in the case of certificate updating). Further signatures by an engineer's laptop, a local registration authority (RA) and the like can be added for transportation protection. Particular protection of the operative certificate on the way from the CA back to the device is generally not necessary since this is not confidential and authenticity and also integrity are ensured by the signature of the CA contained in the certificate.

If the installation is permanently or at least sporadically connected to the RA of the operator such that they can communicate, checking of the CSRs and installation of the new operative certificate can be carried out automatically or via remote access. Otherwise, several visits to the installation by a service engineer are necessary, initially in order to check the CSR and then, after a certificate has been requested and received from the CA, a further visit in order to transmit the certificate to the device.

SUMMARY

An aspect relates to a way of reducing the number of visits to the installation by a service engineer for certificate updating, even in the case of installations without a communication connection to a registration authority or certification authority.

Accordingly, the invention proposes a computer apparatus for transmitting a certificate to a device in an installation. The computer apparatus has a coupling unit for establishing and breaking a connection between the computer apparatus and the device, a processing unit for transmitting a certificate to the device by means of the established connection, wherein the certificate is valid for a first time period and is issued by a certification authority based on a certificate request, and a receiving unit for receiving a further certificate request from the device by means of the established connection, wherein the further certificate request is designed to request a certificate for a second time period, and wherein the coupling unit is designed to break the connection after the certificate is transmitted and the further certificate request is received.

The respective unit, for example processing unit or coupling unit, can be implemented by hardware and/or also by software. In the case of hardware implementation, the respective unit can be designed as an apparatus or as part of an apparatus, for example as a computer or as a microprocessor or as a control computer of a vehicle. In the case of software implementation, the respective unit can be designed as a computer program product, as a function, as a routine, as part of a program code or as an object which can be executed.

In the present case, an installation can be understood to mean, in particular, an industrial installation, an installation for building automation or decentralized energy generation, a domestic installation ("intelligent kitchen", television set, etc.), a stand-alone machine (automated teller machine etc.) or a vehicle, such as an aircraft, rail vehicle, ship or motor vehicle for example.

The coupling unit can establish the connection between the computer apparatus and the device as a cable-free or cable-bound communication connection. During the existing connection, the computer apparatus is not connected to the certification authority. A connection between the computer apparatus and the certification authority can be established only after the connection to the device is broken. Therefore, it is possible that the device and therefore the installation remain decoupled from a public network. The security of the installation can be increased in this way.

The computer apparatus can be connected to the certification authority by means of a local registration authority (RA), or directly to a central certification authority (CA). The certification authority can issue a new certificate based on a certificate request from the device.

The processing unit can transmit a certificate, which is valid for a first time period, to the device after the connection is established. At the same time, the processing unit can receive a certificate request for a new certificate for a second time period, that is to say a next certificate.

Therefore, it is possible for new certificates to be transmitted to a device in an installation by virtue of the proposed computer apparatus, wherein the installation itself is not directly connected to a certification authority.

In order to reduce the number of services, that is to say the number of visits to the device by a service engineer, it is possible by way of the proposed computer apparatus to transmit a new certificate to the device and also to receive a certificate request for a further, future certificate in one session. In a next session, which takes place subsequently, a new certificate can then be transmitted to the device again, this having been collected from the certification authority based on the previous certificate request by the computer apparatus, and a new certificate request for a further certificate can be received once again.

Therefore, a connection between the device and the computer apparatus is required only once in order to transmit a new certificate to the device.

According to one embodiment, the first time period precedes the second time period.

Therefore, when the certificate for the first time period is transmitted, a certificate request for the second, subsequent time period is received at the same time.

According to a further embodiment, the further certificate request contains a new public key of the device.

A new certificate is issued at the certification authority using the transmitted public key. When a new certificate is received, the device checks whether this has been created for the correct dedicated public key. The private key does not leave the device. In this way, the private key cannot be compromised since it is not output by the device.

A new key pair comprising a private and a public key can be generated for each certificate request. In this way, the private key has only a limited validity and therefore has to meet only less stringent safety requirements.

According to a further embodiment, the certificate is an operative certificate.

For operation purposes, the device can be equipped with further, operative certificates. The operative certificate can be used for device-to-device authentication, for device-to-user authentication, as an installation-specific authentication and/or for checking digital signatures, for example in operative or operational processes.

According to a further embodiment, the processing unit is designed to transmit the certificate request to the certification authority and to receive the certificate from the certification authority before a connection between the computer apparatus and the device is established.

Before the certificate can be transmitted to the device, a certificate is first checked and received by the certification authority. This is done by the computer apparatus before connection to the device. The computer apparatus is therefore not connected to the certification authority and the device at the same time.

According to a further embodiment, the processing unit is designed to transmit the further certificate request to the certification authority and to receive a further certificate for the second time period from the certification authority after the connection between the computer apparatus and the device is broken.

The request for a further certificate can be made directly following reception of the certificate request. In this case, the further, new certificate is stored until it is required by the device and is transmitted to the device by the processing unit of the computer apparatus.

As an alternative, the certificate request can be stored until the further certificate is required by the device. In this case, the further certificate is requested from the certification authority at a later time and then transmitted to the device by the processing unit of the computer apparatus.

According to a further embodiment, the processing unit is designed to transmit the further certificate for the second time period to the device by means of the established connection after a further connection between the computer apparatus and the device is established.

This is done after the further certificate has been received from the certification authority.

Instead of only one certificate request, the receiving unit can also receive several certificate requests at once. These can then be used for several certificate updates for requesting several new certificates.

According to a further embodiment, each certificate has a defined run time.

A certificate can have, for example, a run time of at least one service interval. The certificate is preferably generated only shortly before the next visit by a service engineer and therefore a renewed connection of the computer apparatus to the device, in order to not have to revoke the new certificates in the event of the device, the computer apparatus and/or the certification authority being compromised.

According to a further embodiment, the receiving unit is designed to receive a confirmation about the receipt of the certificate from the device.

When installing a certificate, the device can generate a confirmation (Certificate Confirmation Content) with which it confirms receipt of the certificate to the certification authority. A notification of this kind of the certification authority is policy-dependent, for example provision of the certificate in a repository after receipt of the confirmation, or revoking of the certificate after a certain time has elapsed without receipt of the confirmation. The confirmation can be received by the computer apparatus together with the certificate request for the next certificate and can then be transmitted to the certification authority.

This confirmation can primarily also be used in the event of bootstrapping and for updating encryption certificates which are delivered in encrypted form. In order to verify the private key, the device has to decode its certificate. In addition, receipt of the confirmation can optionally likewise be confirmed by the certification authority to the device with a "confirmation of the confirmation" (PKI Confirmation Content). This can likewise be performed in a policy-dependent manner. For example, when this "confirmation of the confirmation" is absent, the device can begin a renewed certificate application since it assumes that its confirmation did not arrive at the certification authority and therefore its certificate cannot be used. The transmission of this "confirmation of the confirmation" can be transmitted to the device in a separate additional connection of the computer apparatus to the device.

According to a further embodiment, the coupling unit is designed to establish the connection as a time-limited connection.

This means that the computer apparatus does not have a permanent communication connection to the device.

According to a further aspect, the invention proposes a system for transmitting a certificate to a device in an installation. The system has at least one device and one computer apparatus, as described above, which is designed to communicate with the device.

In this case, the computer apparatus can communicate with one or with several devices. This can be carried out either by means of a system-internal network, wherein the computer apparatus can communicate with several devices at the same time, or by means of a bidirectional direct coupling between the computer apparatus and the devices.

According to one embodiment, the device does not have a direct communication connection to a certification authority.

The device communicates with the certification authority for receiving a certificate only indirectly by means of the computer apparatus.

According to a further embodiment, the system has a central database for storing the certificate request.

If the certification authority which has created the certificate is compromised, the certificate requests and the certificates accompanying them can further be trusted only when it is possible to ensure that the compromise had taken place after the last connection between the computer apparatus and the device and therefore the checking of the certificate request, and the stored certificate requests and the certificates accompanying them had not been manipulated in the meantime. In this case, new certificates can then simply be created and redistributed by a replacement certification authority. In order to safeguard the certificate requests, a central database which is not connected to the certification authority can be used for example. In this case, the central database can be protected against attacks by suitable security measures.

According to a further aspect, the invention proposes a method for transmitting a certificate to a device in an installation. The method comprises the following steps: establishing a connection between a computer apparatus and the device, transmitting a certificate to the device by means of the established connection, wherein the certificate is valid for a first time period and is issued by a certification authority based on a certificate request, receiving a further certificate request from the device by means of the established connection, wherein the further certificate request is designed to request a certificate for a second time period, and breaking the connection after the certificate is transmitted and the further certificate request is received, wherein the first time period precedes the second time period.

The invention further proposes a computer program product which arranges for the method as explained above to be carried out on a program-controlled device.

A computer program product, such as a computer program means for example, can be provided or supplied, for example, as a storage medium, such as a memory card, USB stick, CD-ROM, DVD for example, or else in the form of a downloadable file from a server in a network. This can be effected, for example, in a wireless communication network by transmitting an appropriate file with the computer program product or the computer program means.

The embodiments and features described for the proposed computer apparatus accordingly apply for the proposed system and also the proposed method.

Further possible implementations of the invention also comprise combinations that are not explicitly mentioned of features or embodiments that are described above or below in respect of the exemplary embodiments. In this case, a person skilled in the art will also add single aspects as improvements or additions to the respective basic form of the invention.

BRIEF DESCRIPTION

Some of the embodiments will be described in detail, with reference to the following figures, wherein like designations denote like members, wherein.

DETAILED DESCRIPTION

In the figures, identical or functionally identical elements have been provided with the same reference symbols unless indicated otherwise.

Figure 1:
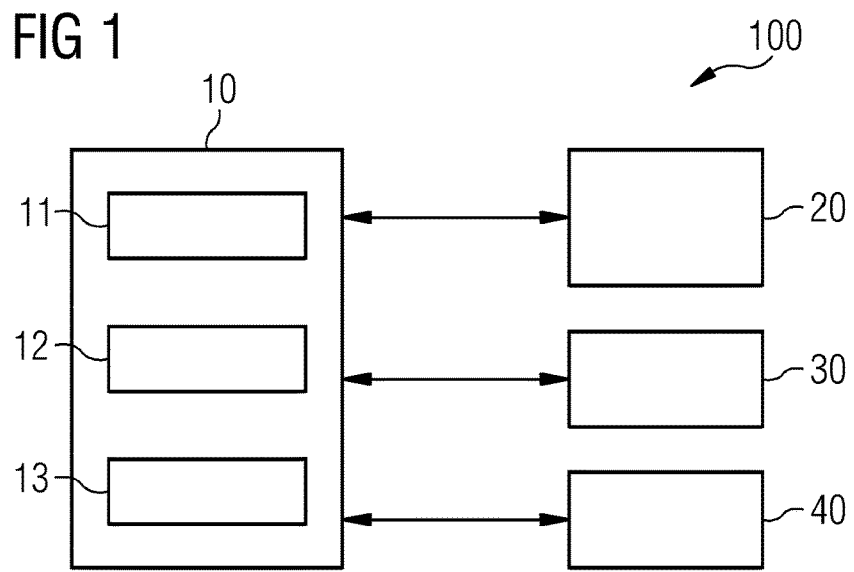
FIG. 1 shows a schematic block diagram of a system for transmitting a certificate to a device in an installation, in accordance with embodiments of the present invention.

FIG. 1 shows a system 100 comprising a computer apparatus 10, a device 20, a certification authority 30 and a central database 40. The database 40 is optional. Although only one device 20 is shown, there may be several devices 20 which are all part of an installation, for example an industrial installation or a vehicle.

The computer apparatus 10 serves to transmit a certificate to the device 20, without the device 20 requiring a direct connection to the certification authority 30. To this end, the computer apparatus 10 has a coupling unit 11, a processing unit 12 and a receiving unit 13.

The computer apparatus 10 can initially communicate with the certification authority 30, in order to receive a certificate for the device 20 from said certification authority, before communicating with the device 20 for the purpose of transmitting a certificate. The certificate, which is valid for a first time period, is created on the basis of a certificate request from the device 20 which was already transmitted to the computer apparatus 10 beforehand.

In order to now carry out communication with the device 20 in order to transmit the certificate, the coupling unit 11 establishes a connection between the computer apparatus 10 and the device 20. The processing unit 12 then transmits the certificate to the device 20 by means of the established connection.

The computer apparatus 10 receives a further certificate request from the device 20 by means of the receiving unit 13.

The further certificate request serves to request a certificate for a second time period from the certification authority 30.

The coupling unit 11 then breaks the connection between the computer apparatus 10 and the device 20.

Figure 2:
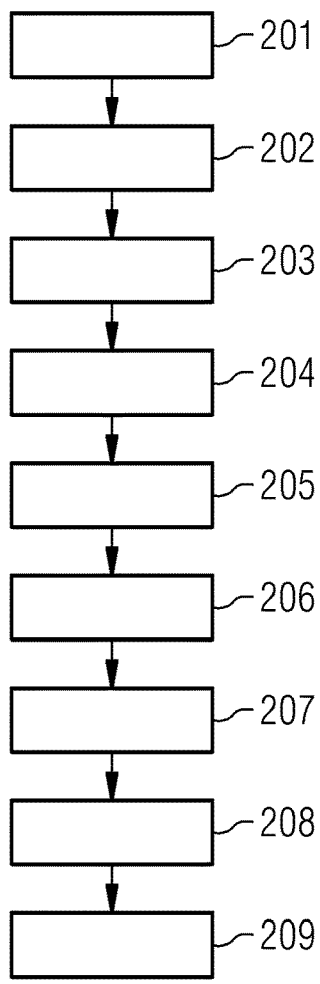
FIG. 2 shows a schematic flowchart of a method for initially transmitting a certificate to a device in an installation, in accordance with embodiments of the present invention.

FIG. 2 shows a flowchart of a method in order to initially transmit a certificate to the device 20. This means that there is initially no certificate request by the device 20 at the computer apparatus 10.

In step 201, a connection is established between the computer apparatus 10 and the device 20.

In step 202, a starting configuration is initially transmitted to the device 20 by the computer apparatus 10 and a certificate request is received from the device 20 in step 203.

In step 204, the connection is initially then broken again.

Then, in step 205, without a connection between the computer apparatus 10 and the device 20, the certificate request is transmitted to a certification authority 30 and a certificate is received.

In step 206, a connection is once again established between the computer apparatus 10 and the device 20.

In step 207, this certificate is then transmitted to the device 20 by the computer apparatus 10. In addition, a new certificate request is then received from the device 20 in step 208. Said new certificate request serves to request a new certificate for a subsequent time period.

Finally, the connection is broken again in step 209.

Figure 3:
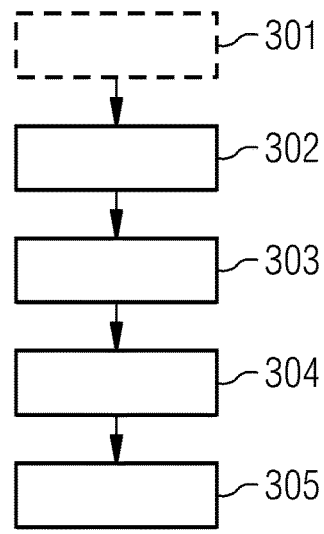
FIG. 3 shows a schematic flowchart of a method for transmitting a certificate to a device in an installation, in accordance with embodiments of the present invention.

FIG. 3 shows a flowchart of a method for transmitting the certificate to the device 20, wherein this transmission can be performed during servicing work on the device 20.

In step 301, which is shown as an optional step here, a certificate is initially requested from the certification authority by means of an already existing certificate request.

In step 302, a connection is established between the computer apparatus 10 and the device 20.

In step 303, the certificate is then transmitted to the device 20 by means of the established connection.

Then, in step 304, a further certificate request from the device 20 is received by means of the established connection.

After the certificate is transmitted and the certificate request is received, the connection is broken in step 305.

The method of FIG. 3 can be repeated at regular intervals in order to equip the device 20 with respectively up-to-date certificates. To this end, only one on-site visit by an engineer with the computer apparatus 10 is required for each update, in the case of which both a new certificate is installed and a certificate request for a subsequent certificate is collected.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A computer apparatus for transmitting a certificate to a device in an installation, comprising:
   a coupling unit for establishing and breaking a connection between the computer apparatus and the device;
   a processing unit for transmitting a certificate to the device by means of an established connection, wherein the certificate is valid for a first time period and is issued by a certification authority based on a certificate request; and
   a receiving unit for receiving a further certificate request from the device by means of the established connection, wherein the further certificate request is designed to request a further certificate for a second time period;
   wherein the device does not have a communication connection to the certification authority;
   wherein during the established connection the computer apparatus cannot connect to the certification authority; and
   wherein the coupling unit is designed to break the established connection after the certificate is transmitted and the further certificate request is received.

2. The computer apparatus as claimed in claim 1, wherein the first time period precedes the second time period.

3. The computer apparatus as claimed in claim 1, wherein the further certificate request contains a public key of the device.

4. The computer apparatus as claimed in claim 1, wherein at least one of the certificate and the further certificate is an operative certificate.

5. The computer apparatus as claimed in claim 1, wherein the processing unit is designed to transmit the certificate request to the certification authority and to receive the certificate from the certification authority before the established connection between the computer apparatus and the device is established.

6. The computer apparatus as claimed in claim 1, wherein the processing unit is designed to transmit the further certificate request to the certification authority and to receive the further certificate for the second time period from the certification authority after the established connection between the computer apparatus and the device is broken.

7. The computer apparatus as claimed in claim 6, wherein the processing unit is designed to transmit the further certificate for the second time period to the device by means of a second established connection after the second established connection between the computer apparatus and the device is established.

8. The computer apparatus as claimed in claim 1, wherein each certificate has a defined run time.

9. The computer apparatus as claimed in claim 1, wherein the receiving unit is designed to receive a confirmation about the receipt of the certificate from the device.

10. The computer apparatus as claimed in claim 1, wherein the coupling unit is designed to establish the established connection as a time-limited connection.

11. A system for transmitting a certificate to a device in an installation, comprising:
    at least one device; and
    at least one computer apparatus designed to communicate with the device, wherein the at least one computer apparatus comprises:
      a coupling unit for establishing and breaking a connection between the computer apparatus and the device;
      a processing unit for transmitting a certificate to the device by means of an established connection, wherein the certificate is valid for a first time period and is issued by a certification authority based on a certificate request; and
      a receiving unit for receiving a further certificate request from the device by means of the established connection, wherein the further certificate request is designed to request a further certificate for a second time period;
wherein the device does not have a communication connection to the certification authority;
wherein during the established connection the computer apparatus cannot connect to the certification authority; and
wherein the coupling unit is designed to break the established connection after the certificate is transmitted and the further certificate request is received.

12. The system as claimed in claim 11 wherein a central database stores the certificate request.

13. A method for transmitting a certificate to a device in an installation, comprising:
establishing a connection between a computer apparatus and the device, wherein during the established connection the computer apparatus cannot connect to a certification authority, and wherein the device does not have a communication connection to the certification authority;
transmitting a certificate to the device by means of the established connection, wherein the certificate is valid for a first time period and is issued by the certification authority based on a certificate request;
receiving a further certificate request from the device by means of the established connection, wherein the further certificate request is designed to request a further certificate for a second time period; and
breaking the established connection after the certificate is transmitted and the further certificate request is received;
wherein the first time period precedes the second time period.

14. A non-transitory computer program product, comprising a computer readable hardware storage device having computer readable program code stored therein, said program code executable by a processor of a computer system to implement a method for transmitting a certificate to a device in an installation, the method comprising:
establishing a connection between a computer apparatus and the device, wherein during the established connection the computer apparatus cannot connect to a certification authority, and wherein the device does not have a communication connection to the certification authority;
transmitting a certificate to the device by means of the established connection, wherein the certificate is valid for a first time period and is issued by the certification authority based on a certificate request;
receiving a further certificate request from the device by means of the established connection, wherein the further certificate request is designed to request a further certificate for a second time period; and
breaking the established connection after the certificate is transmitted and the further certificate request is received;
wherein the first time period precedes the second time period.

* * * * *